United States Patent
Du et al.

(10) Patent No.: US 8,819,778 B2
(45) Date of Patent: Aug. 26, 2014

(54) METHOD AND SYSTEM FOR SWITCHING STATION IN CENTRALIZED WLAN WHEN WPI IS PERFORMED BY ACCESS CONTROLLER

(75) Inventors: Zhiqiang Du, Shaanxi (CN); Jun Cao, Shaanxi (CN); Manxia Tie, Shaanxi (CN); Xiaolong Lai, Shaanxi (CN); Zhenhai Huang, Shaanxi (CN)

(73) Assignee: China Iwncomm Co., Ltd., Shaanxi (CN)

( * ) Notice: Subject to any disclaimer, the term of this patent is extended or adjusted under 35 U.S.C. 154(b) by 0 days.

(21) Appl. No.: 13/320,469

(22) PCT Filed: Dec. 7, 2009

(86) PCT No.: PCT/CN2009/075354
§ 371 (c)(1),
(2), (4) Date: Nov. 16, 2011

(87) PCT Pub. No.: WO2010/130129
PCT Pub. Date: Nov. 18, 2010

(65) Prior Publication Data
US 2012/0054831 A1     Mar. 1, 2012

(30) Foreign Application Priority Data
May 14, 2009    (CN) .......................... 2009 1 0022522

(51) Int. Cl.
*H04L 29/06*    (2006.01)
*H04W 12/06*    (2009.01)

(52) U.S. Cl.
USPC ............................................. 726/3; 380/270

(58) Field of Classification Search
None
See application file for complete search history.

(56) References Cited

U.S. PATENT DOCUMENTS

| 7,133,526 B2 | 11/2006 | Whelan et al. |
| 8,223,727 B2 | 7/2012 | Mitsuhori |

(Continued)

FOREIGN PATENT DOCUMENTS

| CN | 1564626 A | 1/2005 |
| CN | 1756412 A | 4/2006 |

(Continued)

OTHER PUBLICATIONS

Int'l Search Report issued in Int'l. App. No. PCT/CN2009/075354 mailed Mar. 11, 2010.

(Continued)

*Primary Examiner* — Gilberto Barron, Jr.
*Assistant Examiner* — Malcolm Cribbs
(74) *Attorney, Agent, or Firm* — Greer Burns & Crain Ltd.

(57) ABSTRACT

The embodiment of the present invention relates to a method and a system for switching station in centralized wireless local area network (WLAN) when the WLAN privacy infrastructure (WPI) is performed by an access controller (AC). The method includes: step 1: the station re-associates with the AC through the destination wireless terminal point (WTP); step 2: the AC informs the associated WTP to delete the station; step 3: the AC informs the destination WTP to join the station. The invention implements the operation of joining station and deleting station between the AC and the WTP based on the control and provisioning of wireless access points protocol (CAPWAP) control message during the process of switching station. Therefore, the invention can quickly and safely implement the station switching among the WTPs under the same AC.

7 Claims, 1 Drawing Sheet

(56) References Cited

U.S. PATENT DOCUMENTS

| | | |
|---|---|---|
| 8,306,229 B2 | 11/2012 | Pang et al. |
| 8,370,296 B2 | 2/2013 | Tian |
| 8,441,983 B2 | 5/2013 | Calhoun et al. |
| 2002/0085719 A1 | 7/2002 | Crosbie |
| 2005/0036471 A1 | 2/2005 | Singh et al. |
| 2006/0187878 A1 | 8/2006 | Calhoun et al. |
| 2007/0076612 A1 | 4/2007 | Iyer et al. |
| 2007/0104126 A1* | 5/2007 | Calhoun et al. ............ 370/328 |
| 2009/0013378 A1* | 1/2009 | Zhang et al. ................. 726/1 |
| 2010/0322423 A1 | 12/2010 | Boehler et al. |
| 2012/0017088 A1 | 1/2012 | Liu et al. |
| 2012/0054831 A1 | 3/2012 | Du et al. |
| 2012/0060205 A1 | 3/2012 | Tie et al. |
| 2012/0102328 A1 | 4/2012 | Hui et al. |

FOREIGN PATENT DOCUMENTS

| | | |
|---|---|---|
| CN | 1996840 A | 7/2007 |
| CN | 101079891 A | 11/2007 |
| CN | 101155396 A | 4/2008 |
| CN | 101272308 A | 9/2008 |
| CN | 101282352 A | 10/2008 |
| CN | 01335666 A | 12/2008 |
| CN | 101366291 A | 2/2009 |
| CN | 101557592 A | 10/2009 |
| CN | 101562811 A | 10/2009 |
| CN | 101562812 A | 10/2009 |
| CN | 101562811 B | 4/2011 |
| CN | 101562812 B | 6/2011 |

OTHER PUBLICATIONS

English translation for the relevant part (i.e. Section 8) of Introduction of WAPI; GB 15629. 11-2003/XG1; pp. 1-203.
Office action issued in U.S. Appl. No. 13/320,496, mailed Jun. 18, 2013.
Int'l. Search Report issued in Int'l. App. No. PCT/CN2009/075564 mailed Mar. 18, 2010.
Chinese Office Action issued in CN 200910022521.6 dated May 12, 2010.
Xiao-Long et al.; "An 802 11i Robust Security Network Authentication Protocol of Roaming"; Chinese Journal of Computers; vol. 28, No. 12; pp. 2027-2035; Dec. 2005.
Review of WAPI; China Academic Journal Electronic Publishing House; http://www.cnki.net; pp. 31-36.
US Office action issued in U.S. Appl. No. 13/320,496, mailed Nov. 20, 2013.

* cited by examiner

US 8,819,778 B2

METHOD AND SYSTEM FOR SWITCHING STATION IN CENTRALIZED WLAN WHEN WPI IS PERFORMED BY ACCESS CONTROLLER

This application is a U.S. National Stage of International Application No. PCT/CN2009/075354, filed 7 Dec. 2009, designating the United States, and claiming the benefit of Chinese Patent Application No. 200910022522.0, filed with the State Intellectual Property Office of China on May 14, 2009 and entitled "Method and system for switching STA when WPI is performed by AC in centralized WLAN", which is hereby incorporated by reference in its entirety.

FIELD OF THE INVENTION

The present invention relates to a method and system for switching a station when a WPI is performed by an access controller in a centralized WLAN.

BACKGROUND OF THE INVENTION

In an existing Wireless Local Area Network (WLAN) based upon the protocol of WLAN Authentication and Privacy Infrastructure (WAPI), a method for switching a station (STA) is generally proposed for an autonomous WLAN architecture and can not be applicable directly to a WAPI-based centralized WLAN architecture. In the centralized WLAN architecture, functions of WLAN authentication and policy enforcement are managed centrally by an access control device, such as an Access Controller (AC), a wireless switch, or a wireless router, and these devices may also provide centralized functions of, e.g., data bridging, forwarding, and encryption and decryption.

SUMMARY OF THE INVENTION

In order to address the drawback in the prior art that the method for switching an STA in the existing WAPI-based WLAN is applicable only to the autonomous architecture, the invention provides a method and system for switching an STA between Wireless Terminal Points (WTPs) under the same AC when a WLAN Privacy Infrastructure (WPI) is performed by the AC in a centralized WLAN architecture. Here the AC may be replaced with a wireless switch, a wireless router or another device.

The invention provides a method for switching a station when a WPI is performed by an access controller in a centralized WLAN, wherein the method includes:

a step 1 of re-associating the station with the access controller through a destination wireless terminal point;

a step 2 of the access controller instructing an associated wireless terminal point to delete the station; and a step 3 of the access controller instructing the destination wireless terminal point to add the station.

The step 1 particularly includes:

a step 11a of the station listening passively to a beacon frame of the destination wireless terminal point and acquiring parameters of the destination wireless terminal point including a WAPI information element which includes suites of WAI authentication and key management and suites of ciphers supported by the destination wireless terminal point;

a step 12a of the station, in a local MAC mode, transmitting a link authentication request frame to the destination wireless terminal point to request for verifying a link to the destination wireless terminal point, and the destination wireless terminal point transmitting a link authentication response frame to the station in response to the link authentication request frame of the station; and a step 13a of the station, upon successful verification of the link, transmitting a re-association request frame to the access controller to request for being re-associated with the access controller by including an identifier of the currently associated wireless terminal point, an identifier of the access controller and the WAPI information element in the re-association request frame to determine a suite of WAI authentication and key management and a suite of ciphers selected by the station, which are the same as those suites selected by the station upon initial association with the access controller, and the access controller parsing the re-association request frame of the station and transmitting a re-association response frame to the station.

The step 1 particularly includes:

a step 11b of the station listening passively to a beacon frame of the destination wireless terminal point and acquiring parameters of the destination wireless terminal point including a WAPI information element which includes suites of WAI authentication and key management and suites of ciphers supported by the destination wireless terminal point;

a step 12b of the station, in a separate MAC mode, transmitting a link authentication request frame to the access controller to request for verifying a link to the access controller, and the access controller transmitting a link authentication response frame to the station in response to the link verification request frame of the station; and a step 13b of the station, upon successful verification of the link, transmitting a re-association request frame to the access controller to request for being re-associated with the access controller by including an identifier of the currently associated wireless terminal point, an identifier of the access controller and the WAPI information element in the re-association request frame to determine a suite of WAI authentication and key management and a suite of ciphers selected by the station, which are the same as those suites selected by the station upon initial association with the access controller, and the access controller parsing the re-association request frame of the station and transmitting a re-association response frame to the station.

The step 1 particularly includes:

a step 11c of the station transmitting actively a probe request frame to the destination wireless terminal point, the destination wireless terminal point transmitting a probe response frame to the station upon reception of the probe request frame of the station, and the station acquiring relevant parameters of the destination wireless terminal point including a WAPI information element which includes suites of WAI authentication and key management and suites of ciphers supported by the destination wireless terminal point upon reception of the probe response frame;

a step 12c of the station, in a local MAC mode, transmitting a link authentication request frame to the destination wireless terminal point to request for verifying a link to the destination wireless terminal point, and the destination wireless terminal point transmitting a link authentication response frame to the station in response to the link authentication request frame of the station; and a step 13c of the station, upon successful verification of the link, transmitting a re-association request frame to the access controller to request for being re-associated with the access controller by including an identifier of the currently associated wireless terminal point, an identifier of the access controller and the WAPI information element in the re-association request frame to determine a suite of WAI authentication and key management and a suite of ciphers selected by the station, which are the same as those suites selected by the station upon initial association with the access controller, and the access controller parsing the re-association request frame of the station and transmitting a re-association response frame to the station.

The step 1 particularly includes:

a step 11d of the station transmitting actively a probe request frame to the destination wireless terminal point, the destination wireless terminal point transmitting a probe response frame to the station upon reception of the probe request frame of the station, and the station acquiring relevant parameters of the destination wireless terminal point including a WAPI information element which includes suites of WAI authentication and key management and suites of ciphers supported by the destination wireless terminal point upon reception of the probe response frame;

a step 12d of the station, in a separate MAC mode, transmitting a link authentication request frame to the access controller to request for verifying a link to the access controller, and the access controller transmitting a link authentication response frame to the station in response to the link authentication request frame of the station; and a step 13d of the station, upon successful verification of the link, transmitting a re-association request frame to the access controller to request for being re-associated with the access controller by including an identifier of the currently associated wireless terminal point, an identifier of the access controller and the WAPI information element in the re-association request frame to determine a suite of WAI authentication and key management and a suite of ciphers selected by the station, which are the same as those suites selected by the station upon initial association with the access controller, and the access controller parsing the re-association request frame of the station and transmitting a re-association response frame to the station.

The step 2 particularly includes:

a step 21 of the access controller transmitting to the associated wireless terminal point a first CAPWAP station configuration request message including an information element of Delete Station; and a step 22 of the associated wireless terminal point transmitting to the access controller a first CAPWAP station configuration response message including an information element of Result Code to indicate the result of processing the first CAPWAP station configuration request message.

The step 3 particularly includes:

a step 31 of the access controller transmitting to the destination wireless terminal point a second CAPWAP station configuration request message including information elements of Add Station, WAPI Add Station and WAPI Station Session Key, wherein "C" in the information element of WAPI Station Session Key is set as 1 to instruct the destination wireless terminal point to enable a controlled port and forward all of data from the corresponding station, and the WPI is performed by the destination access controller; and a step 32 of the destination wireless terminal point transmitting to the access controller a second CAPWAP station configuration response message including an information element of Result Code to indicate the result of processing the second CAPWAP station configuration request message.

The invention further provides a system for switching an station when a WPI is performed by an access controller in a centralized WLAN, wherein the switching system includes the access controller, a destination wireless terminal point, an associated wireless terminal point and the station, the station is re-associated with the access controller through the destination wireless terminal point, the access controller instructs the associated wireless terminal point to delete the station, and the access controller instructs the destination wireless terminal point to add the station.

In the flow of switching the station when a WPI is performed by an access controller in a centralized WLAN architecture based upon the WAPI protocol according to the invention, operations of adding and deleting the station in the process of switching the station can be performed between the access controller and the wireless terminal point based upon CAPWAP control messages to thereby switch rapidly and securely the station between wireless terminal points under the same access controller.

DETAILED DESCRIPTION OF THE EMBODIMENTS

Figure 1:
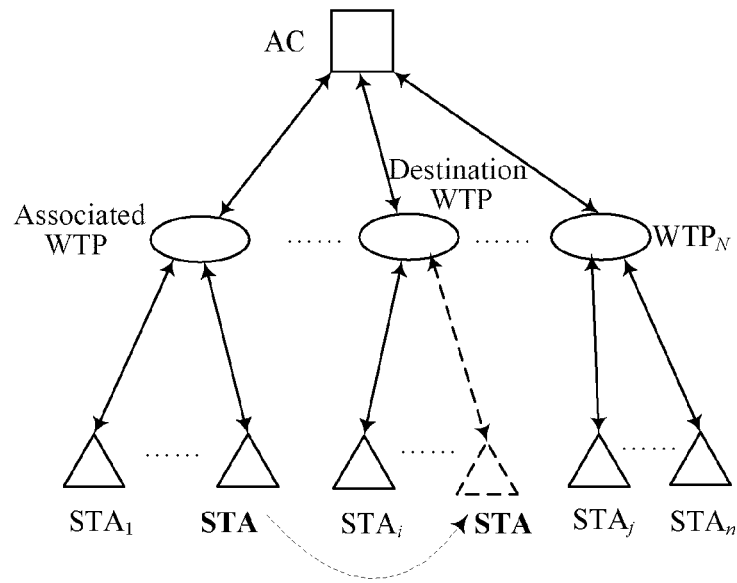
FIG. 1 is a schematic diagram of switching an STA between WTPs under the same AC according to an embodiment of the invention.
Figure 2:
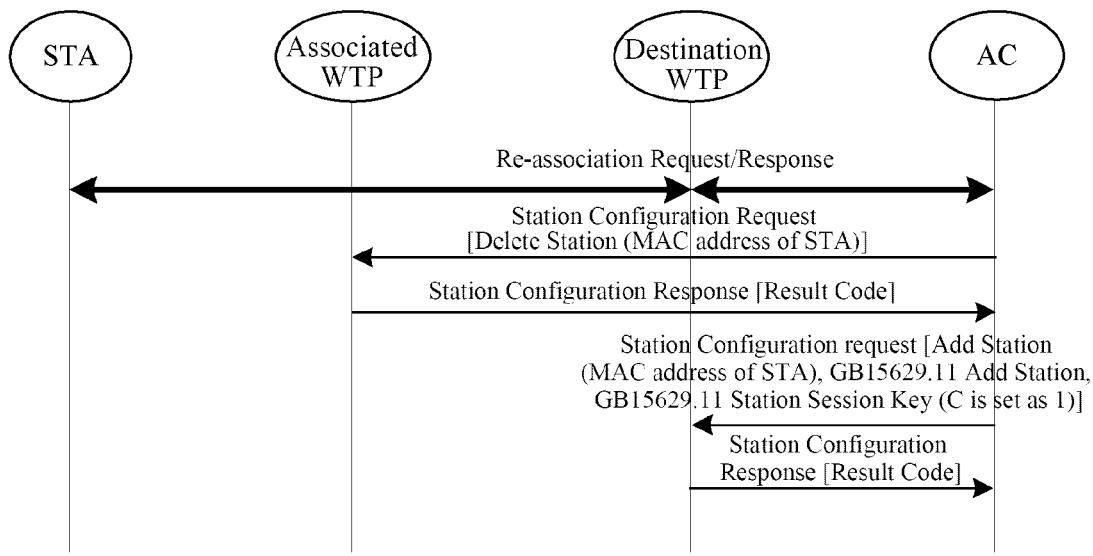
FIG. 2 is a flow chart of switching an STA between WTPs under the same AC according to an embodiment of the invention.

Referring to FIGS. 1 and 2, a method according to a preferred embodiment of the invention is as follows.

In a step 1, an STA is re-associated with an AC through a destination WTP.

In a step 11, the STA listens passively to a beacon frame of the destination WTP and acquires relevant parameters of the destination WTP including a WAPI information element which includes suites of Wireless Local Area Network (WLAN) Authentication Infrastructure (WAI) authentication and key management and suites of ciphers, supported by the destination WTP; or the STA transmits actively a probe request frame to the destination WTP, the destination WTP transmits a probe response frame to the STA upon reception of the probe request frame of the STA, and the STA acquires the relevant parameters of the destination WTP including the WAPI information element which includes the suites of WAI authentication and key management and the suites of ciphers, supported by the destination WTP, upon reception of the probe response frame.

In a step 12, in a local Medium Access Control (MAC) mode, the STA transmits a link authentication request frame to the destination WTP to request for verifying a link to the destination WTP, and the destination WTP transmits a link authentication response frame to the STA in response to the link authentication request frame of the STA; or in a separate MAC mode, the STA transmits a link authentication request frame to the AC to request for verifying a link to the AC, and the AC transmits a link authentication response frame to the STA in response to the link authentication request frame of the STA.

In a step 13, upon successful verification of the link, the STA transmits a re-association request frame to the AC to request for being re-associated with the AC by including an identifier of a currently associated WTP, an identifier of the AC and the WAPI information element in the re-association request frame to determine a suite of WAI authentication and key management and a suite of ciphers, selected by the STA, which are preferably the same as those suites selected by the STA upon initial association with the AC; and the AC parses the re-association request frame of the STA and transmits a re-association response frame to the STA.

In a step 2, the AC instructs the associated WTP to delete the STA.

In a step 21, the AC transmits to the associated WTP a first Control And Provisioning of Wireless Access Points protocol (CAPWAP) station configuration request message including an information element of Delete Station.

In a step 22, the associated WTP transmits to the AC a first CAPWAP station configuration response message including an information element of Result Code to indicate the result of processing the first CAPWAP station configuration request message.

In a step 3, the AC instructs the destination WTP to add the STA.

In a step 31, the AC transmits to the destination WTP a second CAPWAP station configuration request message including information elements of Add Station, WAPI Add Station and WAPI Station Session Key, where "C" in the information element of WAPI Station Session Key is set as 1 to instruct the destination WTP to enable a controlled port to the STA and forward all of data from the STA, and the WPI is performed by the destination AC.

In a step 32, the destination WTP transmits to the AC a second CAPWAP station configuration response message including an information element of Result Code to indicate the result of processing the second CAPWAP station configuration request message.

The invention further provides a system for switching an STA when a WPI is performed by an AC in a centralized WLAN, where the switching system includes the AC, a destination WTP, an associated WTP and the STA, the STA is re-associated with the AC through the destination WTP, the AC instructs the associated WTP to delete the STA, and the AC instructs the destination WTP to add the STA.

It shall be noted that the foregoing embodiments are merely intended to illustrate but not limit the technical solutions of the invention, and although the invention has been detailed in connection with the embodiments, those ordinarily skilled in the art shall appreciate that they still can modify the technical solutions according to the embodiments or make equivalent substitutions of a part of the technical features thereof and that these modifications and substitutions will not make the essence of corresponding technical solutions depart from the scope of the embodiments of the invention.

The invention claimed is:

1. A method for switching a station when a WPI is performed by an access controller in a centralized WLAN, comprising:
   a step 1 of re-associating the station with the access controller through a destination wireless terminal point;
   a step 2 of the access controller instructing an associated wireless terminal point to delete the station; and
   a step 3 of the access controller instructing the destination wireless terminal point to add the station,
   wherein the step 1 comprises:
   a step 11 of the station listening passively to a beacon frame of the destination wireless terminal point and acquiring parameters of the destination wireless terminal point including a WAPI information element which comprises suites of WAI authentication and key management and suites of ciphers supported by the destination wireless terminal point;
   a step 12 of the station, in a local MAC mode, transmitting a link authentication request frame to the destination wireless terminal point to request for verifying a link to the destination wireless terminal point, and the destination wireless terminal point transmitting a link authentication response frame to the station in response to the link authentication request frame of the station; or in a split MAC mode, transmitting a link authentication request frame to the access controller to request for verifying a link to the access controller, and the access controller transmitting a link authentication response frame to the station in response to the link authentication request frame of the station; and
   a step 13 of the station, upon successful verification of the link, transmitting a re-association request frame containing an identifier of the currently associated wireless terminal point, an identifier of the access controller and an WAPI information element to the access controller to request for being re-associated with the access controller, wherein the WAPI information element determines a suite of WAI authentication and key management and a suite of ciphers selected by the station, which are the same as those suites selected by the station upon initial association with the access controller, and the access controller parsing the re-association request frame of the station and transmitting a re-association response frame to the station.

2. The method for switching a station when a WPI is performed by an access controller in a centralized WLAN according to claim 1, wherein the step 2 comprises:
   a step 21 of the access controller transmitting to the associated wireless terminal point a first CAPWAP station configuration request message comprising an information element of Delete Station; and
   a step 22 of the associated wireless terminal point transmitting to the access controller a first CAPWAP station configuration response message comprising an information element of Result Code to indicate the result of processing the first CAPWAP station configuration request message.

3. The method for switching a station when a WPI is performed by an access controller in a centralized WLAN according to claim 2, wherein the step 3 comprises:
   a step 31 of the access controller transmitting to the destination wireless terminal point a second CAPWAP station configuration request message comprising information elements of Add Station, WAPI Add Station and WAPI Station Session Key, wherein "C" in the information element of WAPI Station Session Key is set as 1 to instruct the destination wireless terminal point to enable a controlled port and forward all of data from the corresponding station, and the WPI is performed by the destination access controller; and
   a step 32 of the destination wireless terminal point transmitting to the access controller a second CAPWAP station configuration response message comprising an information element of Result Code to indicate the result of processing the second CAPWAP station configuration request message.

4. A system for switching an station when a WPI is performed by an access controller in a centralized WLAN, wherein the switching system comprises the access controller, a destination wireless terminal point, an associated wireless terminal point and the station, the station is re-associated with the access controller through the destination wireless terminal point, the access controller instructs the associated wireless terminal point to delete the station, and the access controller instructs the destination wireless terminal point to add the station,
   wherein the station listens passively to a beacon frame of the destination wireless terminal point and acquires parameters of the destination wireless terminal point including a WAPI information element which comprises suites of WAI authentication and key management and suites of ciphers supported by the destination wireless terminal point; or the station transmits actively a probe request frame to the destination wireless terminal point, the destination wireless terminal point transmits a probe response frame to the station upon reception of the probe request frame of the station, and the station acquires relevant parameters of the destination wireless terminal point comprising a WAPI information element which comprises suites of WAI authentication and key management and suites of ciphers supported by the destination wireless terminal point upon reception of the probe response frame;

in a local MAC mode, the station transmits a link authentication request frame to the destination wireless terminal point to request for verifying a link to the destination wireless terminal point, and the destination wireless terminal point transmits a link authentication response frame to the station in response to the link authentication request frame of the station; or in a split MAC mode, the station transmits a link authentication request frame to the access controller to request for verifying a link to the access controller, and the access controller transmits a link authentication response frame to the station in response to the link authentication request frame of the station; and upon successful verification of the link, the station transmits a re-association request frame containing an identifier of the currently associated wireless terminal point, an identifier of the access controller and an WAPI information element to the access controller to request for being re-associated with the access controller, wherein the WAPI information element determines a suite of WAI authentication and key management and a suite of ciphers selected by the station, which are the same as those suites selected by the station upon initial association with the access controller, and the access controller parses the re-association request frame of the station and transmitting a re-association response frame to the station.

5. A method for switching a station when a WPI is performed by an access controller in a centralized WLAN, comprising:

a step 1 of re-associating the station with the access controller through a destination wireless terminal point;

a step 2 of the access controller instructing an associated wireless terminal point to delete the station; and a step 3 of the access controller instructing the destination wireless terminal point to add the station, wherein the step 1 comprises:

a step 11 of the station transmitting actively a probe request frame to the destination wireless terminal point, the destination wireless terminal point transmitting a probe response frame to the station upon reception of the probe request frame of the station, and the station acquiring relevant parameters of the destination wireless terminal point comprising a WAPI information element which comprises suites of WAI authentication and key management and suites of ciphers supported by the destination wireless terminal point upon reception of the probe response frame;

a step 12 of the station, in a local MAC mode, transmitting a link authentication request frame to the destination wireless terminal point to request for verifying a link to the destination wireless terminal point, and the destination wireless terminal point transmitting a link authentication response frame to the station in response to the link authentication request frame of the station; or in a split MAC mode, transmitting a link authentication request frame to the access controller to request for verifying a link to the access controller, and the access controller transmitting a link authentication response frame to the station in response to the link authentication request frame of the station; and a step 13 of the station, upon successful verification of the link, transmitting a re-association request frame containing an identifier of the currently associated wireless terminal point, an identifier of the access controller and an WAPI information element to the access controller to request for being re-associated with the access controller, wherein the WAPI information element determines a suite of WAI authentication and key management and a suite of ciphers selected by the station, which are the same as those suites selected by the station upon initial association with the access controller, and the access controller parsing the re-association request frame of the station and transmitting a re-association response frame to the station.

6. The method for switching a station when a WPI is performed by an access controller in a centralized WLAN according to claim 5, wherein the step 2 comprises:

a step 21 of the access controller transmitting to the associated wireless terminal point a first CAPWAP station configuration request message comprising an information element of Delete Station; and a step 22 of the associated wireless terminal point transmitting to the access controller a first CAPWAP station configuration response message comprising an information element of Result Code to indicate the result of processing the first CAPWAP station configuration request message.

7. The method for switching a station when a WPI is performed by an access controller in a centralized WLAN according to claim 6, wherein the step 3 comprises:

a step 31 of the access controller transmitting to the destination wireless terminal point a second CAPWAP station configuration request message comprising information elements of Add Station, WAPI Add Station and WAPI Station Session Key, wherein "C" in the information element of WAPI Station Session Key is set as 1 to instruct the destination wireless terminal point to enable a controlled port and forward all of data from the corresponding station, and the WPI is performed by the destination access controller; and a step 32 of the destination wireless terminal point transmitting to the access controller a second CAPWAP station configuration response message comprising an information element of Result Code to indicate the result of processing the second CAPWAP station configuration request message.

* * * * *